United States Patent [19]
Nakayama et al.

[11] Patent Number: 5,831,765
[45] Date of Patent: *Nov. 3, 1998

[54] TWO-DIMENSIONAL/THREE-DIMENSIONAL COMPATIBLE TYPE IMAGE DISPLAY

[75] Inventors: Eiji Nakayama; Goro Hamagishi; Atsuhiro Yamashita; Ken Mashitani; Masahiro Sakata, all of Osaka; Yoshihiro Furuta; Shinobu Kohtani, both of Hyogo; Kenji Taima; Shugo Yamashita, both of Osaka, all of Japan

[73] Assignee: Sanyo Electric Co., Ltd., Osaka-Fu, Japan

[*] Notice: This patent issued on a continued prosecution application filed under 37 CFR 1.53(d), and is subject to the twenty year patent term provisions of 35 U.S.C. 154(a)(2).

[21] Appl. No.: 651,241

[22] Filed: May 22, 1996

[30] Foreign Application Priority Data

May 24, 1995 [JP] Japan ................................. 7-125347
Aug. 1, 1995 [JP] Japan ................................. 7-196641
Apr. 25, 1996 [JP] Japan ................................. 8-105845

[51] Int. Cl.⁶ .......................... G02B 27/22; G02B 5/02; G02F 1/1335
[52] U.S. Cl. ..................... 359/464; 359/475; 359/613; 349/15; 349/64
[58] Field of Search ................................. 359/464, 463, 359/462, 465, 613, 614, 894, 475; 349/15, 64; 348/54, 59

[56] References Cited

U.S. PATENT DOCUMENTS

| | | | |
|---|---|---|---|
| 3,920,311 | 11/1975 | Tsuda et al. ........................... | 349/67 |
| 4,323,952 | 4/1982 | Proske ................................... | 362/17 |
| 5,046,827 | 9/1991 | Frost et al. ............................ | 359/559 |
| 5,392,140 | 2/1995 | Ezra et al. ............................. | 359/15 |
| 5,410,345 | 4/1995 | Eichenlaub ........................... | 359/475 |
| 5,465,175 | 11/1995 | Woodgate et al. ................... | 359/464 |

FOREIGN PATENT DOCUMENTS 5-107500  4/1993  Japan.

OTHER PUBLICATIONS

Abstract of International Publication No. WO 94/06249, filed Mar. 17, 1994.

*Primary Examiner*—Jon W. Henry
*Attorney, Agent, or Firm*—Nikaido Marmelstein Murray & Oram, LLP

[57] ABSTRACT

The 2-D/3-D compatible type image display according to the present invention is constructed by arranging a liquid crystal panel which is a display panel, a dispersed type liquid crystal panel which is a diffusing effect on/off panel, a light separating means, a backlight which is a plane light source, so as to be nearer to an observer in this order. It is possible by processing the image signal supplied to the liquid crystal panel to form a first group of pixels lined in longitudinal direction of a picture and a second group of pixels lined in the same direction of the picture alternately formed in horizontal direction, and to make the first group of pixels and the second group of pixels have different observing points respectively as left eye pixels and right eye pixels (when 3-D images are displayed), or to make the first group of pixels and the second group of pixels have the same observing points with each other (when 2-D images are displayed). When 3-D images are displayed, light from the light separating means is transmitted by making diffusing effect off. When 2-D images are displayed, light from the light separating means is diffused by making diffusing effect on.

18 Claims, 16 Drawing Sheets

Fig.6A
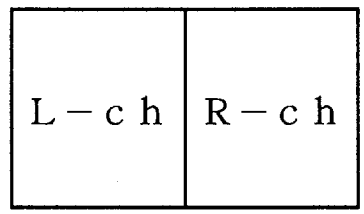
Fig.6B
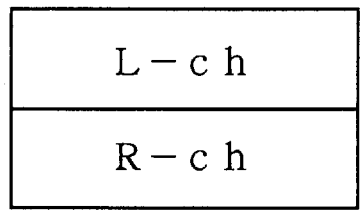
Fig.7
| reproduced image | information of barrier positions | code |
|---|---|---|
| A | all off | 0000000000000000 |
| B | a0b0c0d0a1b1c1d1OFF | 0000000011111111 |
| C | a0b0a1b1a2b2a3b3OFF | 0011001100110011 |
| | | |

TWO-DIMENSIONAL/THREE-DIMENSIONAL COMPATIBLE TYPE IMAGE DISPLAY

BACKGROUND OF THE INVENTION

The present invention relates to a two-dimensional (2-D)/three dimensional (3-D) compatible type image display capable of switching 3-D images and 2-D images to display or including both of 3-D and 2-D images in one display area.

Description of the Prior Art

As a method of displaying three-dimensional images without using glasses, a lenticular method and a parallax barrier method have been conventionally proposed.

The parallax barrier method is, as shown in FIG. 17, a method that a parallax barrier substrate 2 comprising transmitting portions 2a which are aperture portion where light passes by and barrier portions 2b which are located to block the light alternately formed in horizontal direction on the emission side (observer's side) of light from a liquid crystal panel (display panel) 1 comprising left eye pixels L and right eye pixels R, which have different observing points to each other, alternately formed in a horizontal direction.

Out of light emitted from left eye pixels L of the liquid crystal panel 1, light 4L1 emitted toward a left eye 3L of an observer in a proper observing position passes the transmitting portions 2a and gets into the left eye 3L of the observer. Light 4L2 emitted toward a right eye 3R of the observer is blocked by the barrier portions 2b not to get into the right eye 3R of the observer. Furthermore, out of light emitted from right eye pixels R of the liquid crystal panel 1, light 4R1 emitted toward the right eye 3R of the observer in the proper observing position passes the transmitting portion 2a and gets into the right eye 3R of the observer. Light 4R2 emitted toward the left eye 3L of the observer is blocked by the barrier portions 2b not to get into the left eye 3L of the observer. Consequently, the observer in the proper observing position views only left eye pixels L with the left eye 3L, right eye pixels R with the right eye 3R, and 3-D images by parallax between right and left eyes. In FIG. 17, the liquid crystal panel 1 is simply drawn with an arrangement of pixels only.

Plane images (ordinary 2-D images) can be displayed with a 3-D image display having above-described construction, by making a left eye image signal and a right eye image signal which are input to the liquid crystal panel 1 be the same image signals with each other. For example, if a display area on the liquid crystal panel 1 is created on the bases of the left eye image signal only, all of display pixels on the liquid crystal panel 1 are left eye pixels L, as shown in FIG. 18. Consequently, the observer in the proper observing position recognizes the same left eye image with the left eye 3L and the right eye 3R, whereby the observer views an ordinary 2-D image without parallax between right and left eyes.

However, when 2-D images are displayed on above-described conventional 3-D display, observer can view good plane images only in the proper observing position, although resolution of images is degraded because only half number of pixels reach respective eyes. If the observer is out of the proper observing position, a part of the light 4L2 emitted from pixels L toward right and left eyes 3L, 3R of the observer is blocked by the barrier portions 2b, whereby the observer recognizes moire or the like in the display area. Therefore, it is a problem that good 2-D images without moire or the like can be observed within limited range, and the observer cannot move freely.

The present invention has been made in view of the disadvantages of the above-described prior art and has for its object to provide a 2-D/3-D compatible type image display capable of switching 3-D and 2-D images to display, and an observer can view good 2-D images without degradation because of barriers, moire or the like in wide range, not only in limited positions, when 2-D images are displayed.

Existing prior arts of 2-D/3-D compatible type image display realizing above object are disclosed, for example, in Japanese Patent Laid-Open Gazette No. 107500/1993 and International Publication Number WO94/06249 (International Application Number PCT/US93/08412). According to these prior arts, a diffusing effect on/off panel is arranged between a vertical striped light source and a liquid crystal panel, and diffusing effect is on when 2-D images are displayed.

According to the prior art disclosed in Japanese Patent Laid-Open Gazette No. 107500/1993, however, the vertical striped light source is realized with a small reflecting mirror which needs delicate processing technique. Thus, realization of the art is rather difficult.

According to the prior art disclosed in WO94/06249, a lenticular lens screen is arranged on the light emission side of the vertical striped light source, and a diffusing sheet which forms images from the vertical striped light source which are made small through process of the lenticular lens screen is provided. As well as 3-D images realized by on/off of two light sources and image on the liquid crystal panel synchronizing with it, 2-D images without degradation are realized by on/off of the diffusing effect on/off panel arranged between the vertical striped light source and the lenticular lens screen. However, the device of the art is not only complicated in construction but also increased in size since projection from two vertical striped light source which are rather large in size on the diffusing sheet needs large depth.

Furthermore, in both of above prior arts, it is difficult to obtain high image quality for both of 2-D and 3-D images when both of displaying condition for 3-D images and displaying condition for 2-D images are included in one display area.

Another object of the present invention is to provide a 2-D/3-D compatible type image display in which 2-D images without degradation are displayed using a diffusing effect on/off panel, construction of a light separating means or whole device is not complicated, and miniaturization of the device can be realized. still another object of the present invention is to obtain high image quality for both of 2-D and 3-D images when displaying condition for 3-D images and displaying condition for 2-D images are included in one display area.

SUMMARY OF THE INVENTION

A 2-D/3-D compatible type image display according to the present invention is characterized by comprising a display panel in which display areas are constructed with a first group of pixels and a second group of pixels, a plane light source which is formed on the light incidence side of the display panel and emits light in a plane shape, a light separating means which is formed between the display panel and the plane light source and separates light from the first group of pixels and the second group of pixels into the right and the left, and a diffusing effect on/off panel which is controlled not to diffuse but to pass the light from the light separating means by making the first group of pixels and the second group of pixels have different observing points to each other respectively as left eye pixels and right eye pixels when 3-D images are displayed, and to diffuse the light from the light separating means by making the first group of pixels and the second group of pixels have the same observing points with each other when 2-D images are displayed.

In above-described construction, when a diffusing effect on/off panel is used for displaying 2-D images without degradation, a vertical striped light source can be realized simply by arranging a light separating means on the front surface of a light source (backlight). Furthermore, simplification of construction and miniaturization of the device can be realized.

The 2-D/3-D compatible type image display according to the present invention is characterized by comprising a display panel in which display areas are constructed with a first group of pixels and a second group of pixels, a light separating means which separates light from said first group of pixels and said second group of pixels into the right and the left, and a diffusing effect on/off panel which is controlled so that the light from said light separating means is diffused in a region corresponding to a region of the display area for displaying said 2-D images and passes a region corresponding to a region of the display area for displaying 3-D images without being diffused, when 3-D images obtained by making said first group of pixels and said second group of pixels have different observing points to each other respectively as left eye pixels and right eye pixels and 2-D images obtained by making said first group of pixels and said second group of pixels have the same observing points are included in one display area.

In above-described construction, high image quality for both of 2-D and 3-D images can be obtained when displaying condition for 3-D images and displaying condition for 2-D images are included in one display area.

A concrete example of signal system for including both of 2-D images and 3-D images in one display area in above construction is, for example, a drive controlling means which input image signal including both of 2-D images and 3-D images, as well as information of region for diffusion, and partially create diffusing effect region in said diffusing effect on/off panel on the basis of the information of region for diffusion.

A concrete example of above construction for switching on/off diffusing effect is, for example, a diffusing effect on/off panel which is a dispersed type liquid crystal panel. A plurality of electrodes are formed on at least one inside surface of the dispersed type liquid crystal panel, and any one, or a plurality, or all of said plurality of electrodes can be applied voltage. In such a construction, an information showing on which of a plurality of electrodes voltage should be applied can be used as the information of regions for diffusion.

Furthermore, the 2-D/3-D compatible type image display according to the present invention is characterized by comprising a display panel in which display areas are constructed with a first group of pixels and a second group of pixels, a light separating means which separates light from said first group of pixels and said second group of pixels into the right and the left, and a light diffusing means which is arranged for diffusing light from said light separating means when 2-D images are displayed by making said first group of pixels and said second group of pixels have the same observing points, and removed for not diffusing but for passing the light when 3-D images are displayed by making said first group of pixels and said second group of pixels have the different observing points to each other respectively as left eye pixels and right eye pixels.

According to above-described construction, when 2-D images are displayed, the light separated in the right and the left by the light separating means is diffused by the light diffusing means and emitted spreading in various directions. Consequently, light from left eye pixels and light from right eye pixels reach wide range on the side of the observer without being separated in the right and the left and 2-D images without degradation can be observed. When 3-D images are displayed, on the other hand, the light diffusing means is removed from the front of the display area, whereby the light separated in the right and the left by the light separating means reach the observer keeping the separated condition. The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6A is an explanatory diagram showing an example format of 3-D image signal provided to the 2-D/3-D compatible type image display according to the third embodiment of the present invention;

FIG. 6B is an explanatory diagram showing another example format of 3-D image signal provided to the 2-D/3-D compatible type image display according to the third embodiment of the present invention;

FIG. 7 is a diagram showing example relationship between image signal including both of 2-D and 3-D images and the information of barrier positions;

DESCRIPTION OF THE PREFERRED EMBODIMENTS (Preferred Embodiment 1)

Description is now made of a first embodiment of the present invention.

Figure 1:
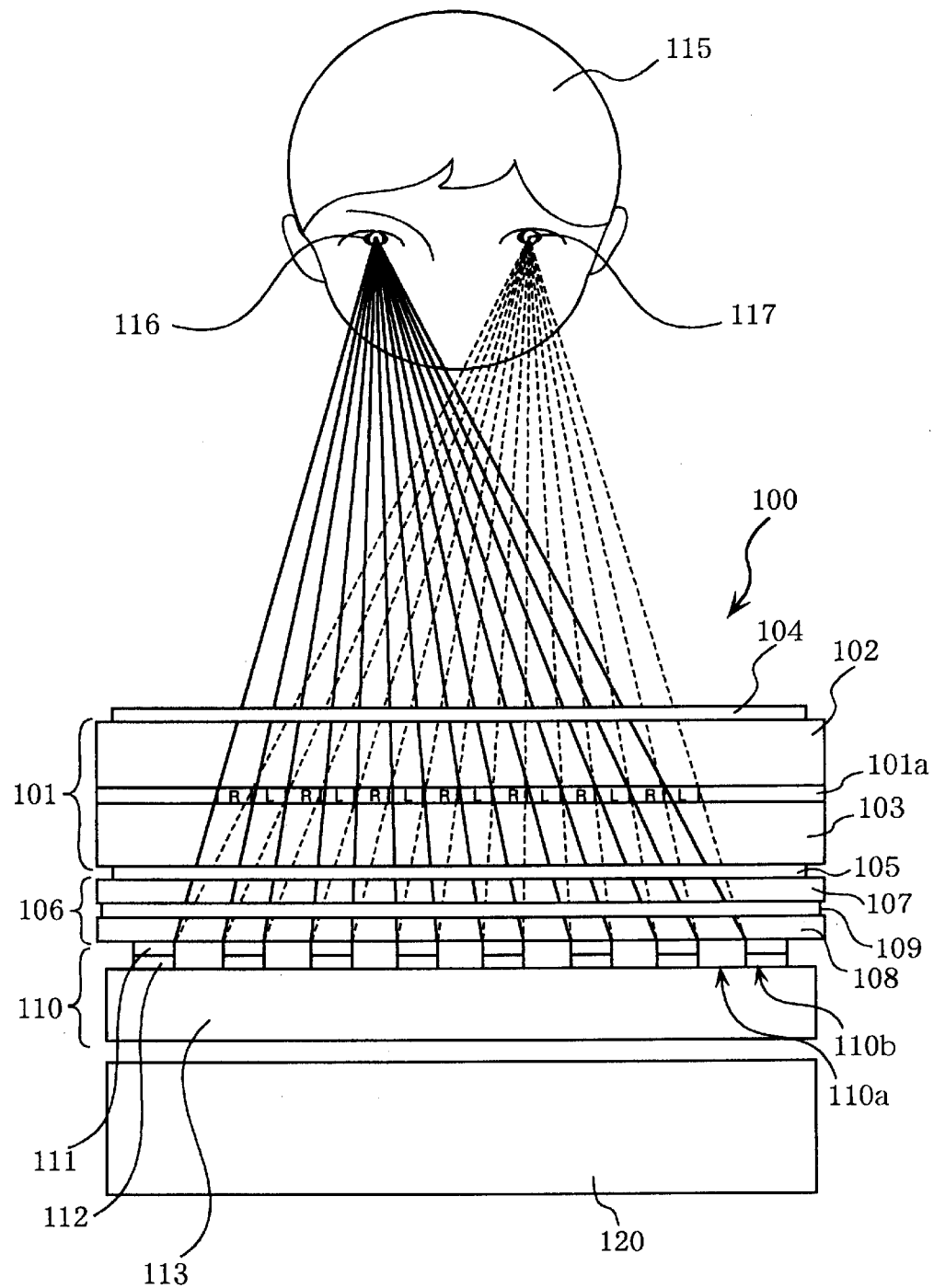
FIG. 1 is a plane view showing the 2-D/3-D compatible type image display according to a first embodiment of the present invention.

FIG. 1 is a plane view showing a 2-D/3-D compatible image display 100 according to this embodiment. The 2-D/3-D compatible type image display 100 is constructed by arranging a liquid crystal panel 101 which is a display panel, a dispersed type liquid crystal panel 106 which is a diffusing effect on/off panel, a light separating means 110, and backlight 120 which is a plane light source, so as to be nearer to an observer 115 in this order. These elements are united by sticking the dispersed type liquid crystal panel 106 to the liquid crystal panel 101.

The liquid crystal panel 101 comprises a glass substrate on the light emission side 102, a glass substrate on the light incidence side 103, a liquid crystal layer 101a arranged between the substrates 102 and 103, a polarizing plate on observer's side 104 which is stuck to the light emission side of the glass substrate on the Light emission side 102, and a backside polarizing plate 105 which is stuck to the light incidence side of the glass substrate on the light incidence side 103. The liquid crystal panel 101 is driven in, for example, matrix driving method, and images are displayed by applying voltages to a transparent pixel electrode which is not illustrated, corresponding to an image signal. It is possible by processing the image signal supplied to the liquid crystal panel 101 to alternately form a first group of pixels lined in vertical direction of a display area and a second group of pixels lined in the same direction of the display area in horizontal direction, and to make the first group of pixels and the second group of pixels have different observing points respectively as left eye pixels and right eye pixels, or to make the first group of pixels and the second group of pixels have the same observing points with each other.

The dispersed type liquid crystal panel 106 comprises a transparent sheet on the light emission side 107, a transparent sheet on the light incidence side 108, and a dispersed type liquid crystal layer 109 arranged between these sheets 107 and 108. As examples of the dispersed type liquid crystal, two kinds of Polymer Dispersed Liquid Crystal (PDLC) that is the encapsulation of micro-droplets of nematic liquid crystals in polymer matrices or that liquid crystal is dispersed in mesh of polymer can be mentioned. The PDLC may let the light pass when voltage is applied and diffuse the light when voltage is not applied, or instead it may let the light pass when voltage is not applied and diffuse the light when voltage is applied. The dispersed type liquid crystal panel 106 is provided with a whole transparent electrode which is not illustrated (for example ITO), whereby diffusing effect of whole display area can be made on or off by applying voltage.

The light separating means 110 comprises vertical striped transmitting portions 110a and vertical striped barrier portions 110b alternately formed in horizontal direction on an upper surface (which faces to the dispersed type liquid crystal panel 106) of the glass substrate 113. The transmitting portions 110a and the barrier portions 110b are formed at a predetermined pitch to separate light from the first group of pixels and the second group of pixels to the right and the left. Each barrier portion 110b comprises a reflecting film 112 and a light absorbing film 111. The reflecting film 112 is formed on the glass substrate 113, and the light absorbing film 111 is formed on the reflecting film 112. In other words, the reflecting film 112 is formed on a side of the glass substrate 113 for receiving light from the backlight 120. For example, Al (Aluminum) or the like is used as forming material of the reflecting film 112, and Chromium oxide or the like is used as that of the light absorbing film 111. The vertical striped transmitting portions 110a and the barrier portions 110b can be formed by laminating a forming material of the reflecting film 112 on upper surface of the glass substrate 113, laminating a forming material of the light absorbing film 111 thereon, and removing portions to be the transmitting portions 110a through etching.

When 3-D images are displayed in above construction, an image signal is given to the liquid crystal panel 101 so that the first group of pixels work as right eye pixels, for example, and the second group of pixels work as left eye pixels. Diffusing effect of the dispersed type liquid crystal panel 106 is off so that light from the light separating means 110 passes by without being diffused. Accordingly, as shown in FIG. 1, right eye images and left eye images are separated and respectively reach a right eye 116 and a left eye 117 of the observer 115, whereby the observer 115 recognizes 3-D images.

Figure 2:
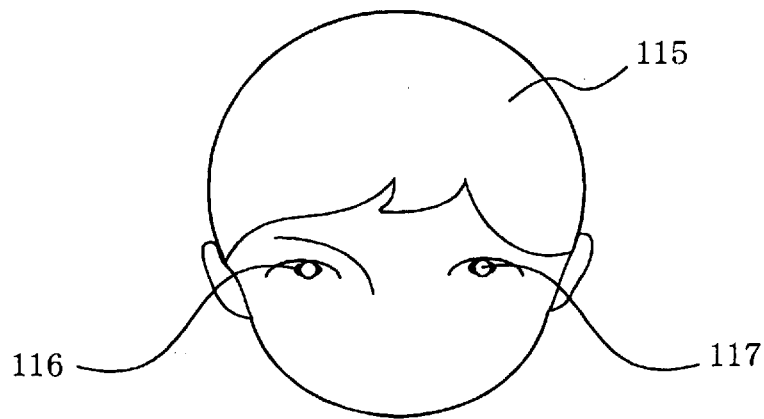
FIG. 2 is a plane view showing the 2-D/3-D compatible type image display of FIG. 1 in a condition that diffusing effect of the dispersed type liquid crystal panel is on (an observer recognizes light in a condition that it is not separated in the right and the left)
Figure 2:
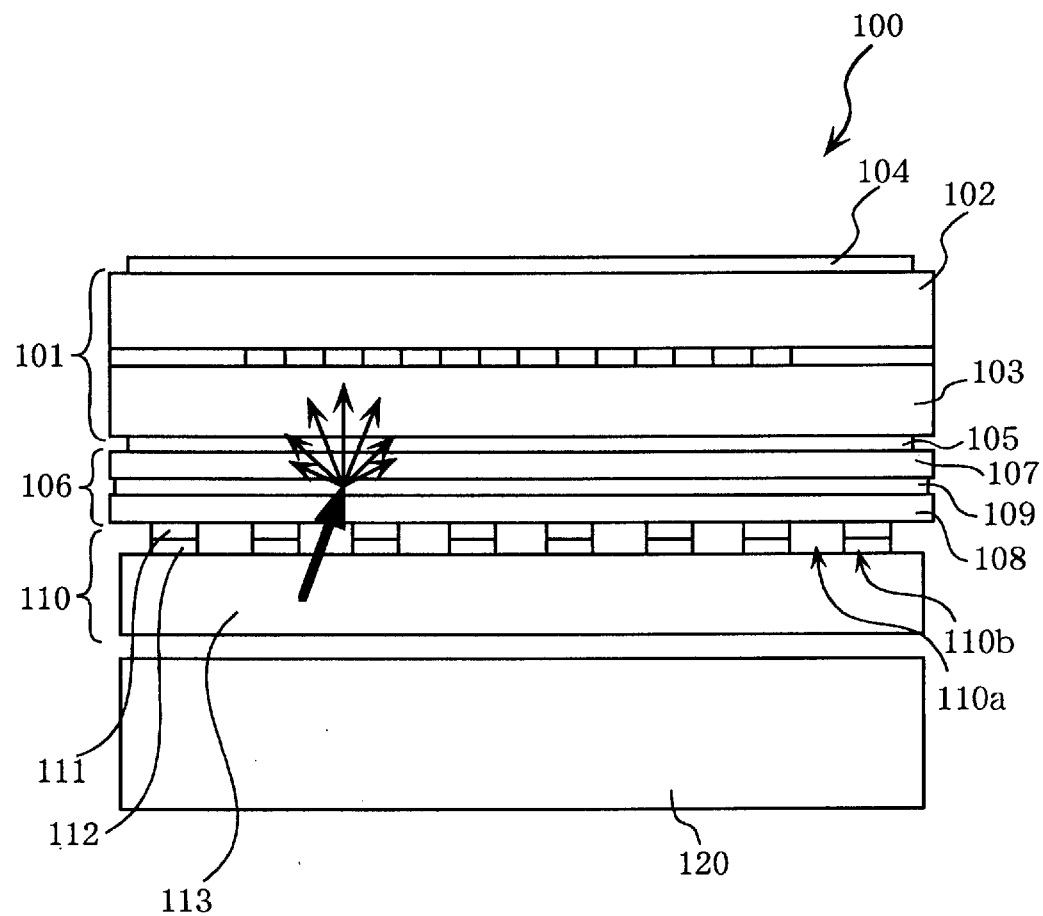

On the other hand, when 2-D images are displayed in above construction, an image signal is given to the liquid crystal panel 101 so that the first group of pixels and the second group of pixels have the same observing points with each other. Diffusing effect of the dispersed type liquid crystal panel 106 is on. Accordingly, as shown in FIG. 2, light from the light separating means 110 is diffused and the observer 115 views all pixels of the liquid crystal panel 101 with both of the right eye 116 and the left eye 117, whereby the observer 115 can view 2-D images of high image quality.

According to above-described construction, the light separating means 110 comprises vertical striped barrier portions 110b and vertical striped transmitting portions 110a alternately formed in horizontal direction for separating light from the first group of pixels and the second group of pixels to the right and the left. A vertical striped light source can be easily realized by arranging the light separating means 110 on a front surface of the backlight 120. Moreover, simplification of construction and miniaturization of the device can be realized.

Each barrier portion 110b of the light separating means 110 is formed by laminating the reflecting film 112 which is arranged on the side of the backlight 120 and the light absorbing film 111 which is arranged on the side of the liquid crystal panel 101, whereby absorption of light from the backlight 120 is decreased and efficiency of the light is increased.

Furthermore, uniting the liquid crystal panel 101 and the dispersed type liquid crystal panel 106 by sticking to each other, assembly of the parts can be simplified.

(Preferred Embodiment 2)

Description is now made of a second embodiment of the present invention in accordance with figures. For the convenience, the same reference numerals are used to indicate members already referred to in the description of the first embodiment.

Figure 3:
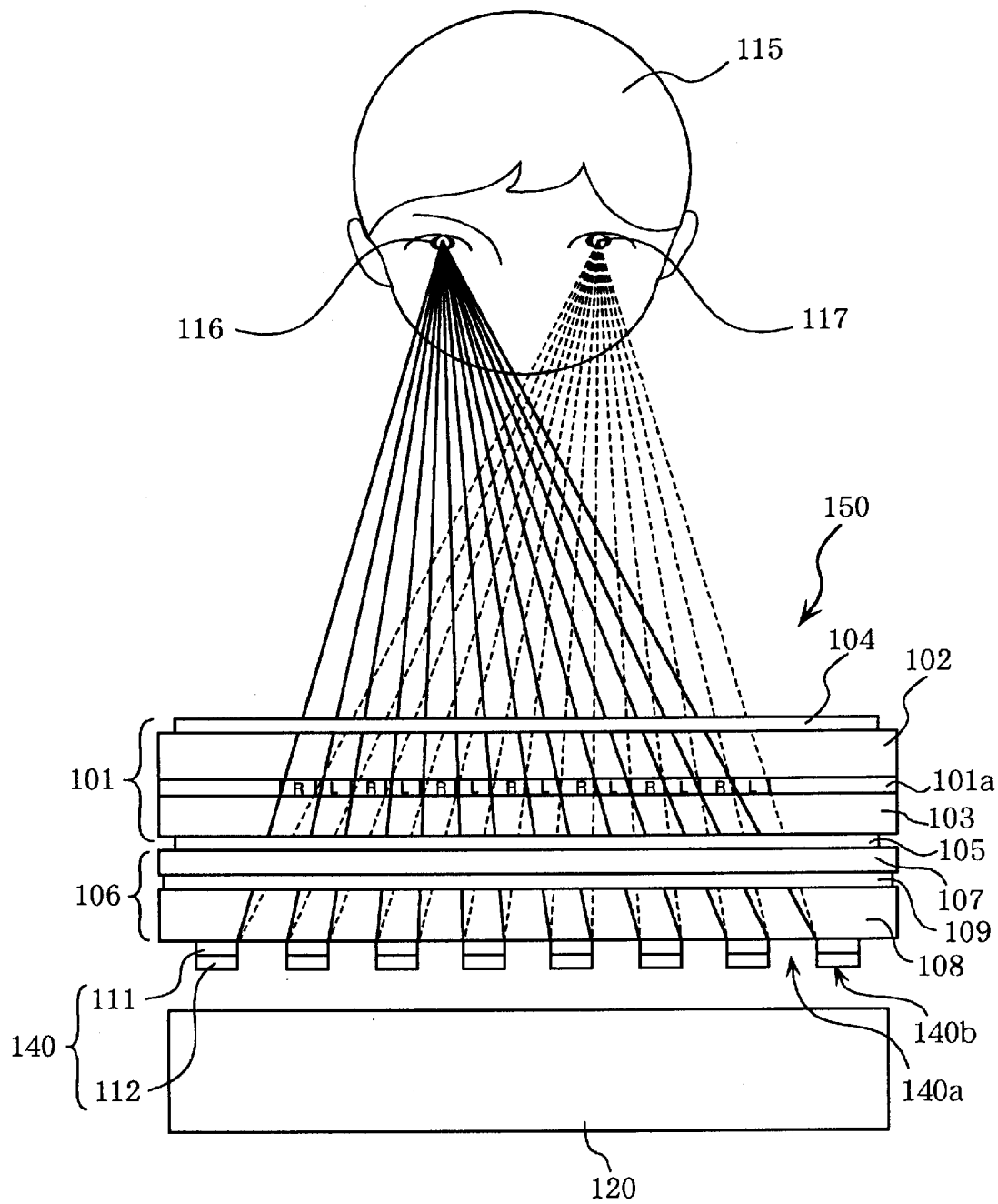
FIG. 3 is a plane view showing the 2-D/3-D compatible type image display according to a second embodiment of the present invention.

FIG. 3 is a plane view showing the 2-D/3-D compatible type image display 100 according to the second embodiment of the present invention. A 2-D/3-D compatible type image display 150 is constructed by arranging the liquid crystal panel 101 which is a display panel, the dispersed type liquid crystal panel 106 which is a diffusing effect on/off panel, the light separating means 140, and the backlight 120 which is a plane light source, so as to be nearer to the observer 115 in this order. These elements are united by sticking the dispersed type liquid crystal panel 106 to the liquid crystal panel 101.

Constructions of the liquid crystal panel 101 and the dispersed type liquid crystal panel 106 are the same with those in the first embodiment.

The light separating means 140 is formed on the other surface, which is the light incidence side, of the same glass substrate on the light incidence side 108, with the dispersed type liquid crystal panel 106, not having another substrate corresponding to the glass substrate 113 in the first embodiment. The light separating means 140 comprises vertical striped transmitting portions 140a and barrier portions 140b alternately formed in horizontal direction at a predetermined pitch so as to separate light from the first group of pixels and the second group of the pixels into the right and the left. Each barrier portion 140b comprises the reflecting film 112 and the light absorbing film 111. The light absorbing film 111 is formed on the glass substrate on the light incidence side 108, and the reflecting film 112 is formed on the light absorbing film 111. In other words, the reflecting film 112 is formed on a side which receives light from the backlight 120. Forming materials of the light absorbing film 111 and the reflecting film 112 and how to form the transmitting portions 140a and barrier portions 140b are the same with those in the first embodiment.

According to construction of the second embodiment, the light separating means 140 and the dispersed type liquid crystal 106 are united and both of two comprise the same glass substrate on the light incidence side 108 as one element, whereby number of parts can be decreased, assembly of the parts can be simplified, and reliability of the device can be improved.

(Preferred Embodiment 3)

According to a third embodiment of the present invention, a transparent electrode formed on a dispersed type liquid crystal panel is separated into a plurality of electrodes, as well as light from the light separating means are diffused in a range corresponding to a range of a display area in which 2-D images are displayed and passes by in a range corresponding to a range of the display area in which 3-D images are displayed, when both of 2-D images and 3-D images are displayed on one display area. As an optical method to separate right eye images and left eye images, constructions of above first and second embodiments or those of Japanese Patent Laid-Open Gazette No. 107500/1993 and WO94/06249, and other constructions can be employed.

Figure 4:
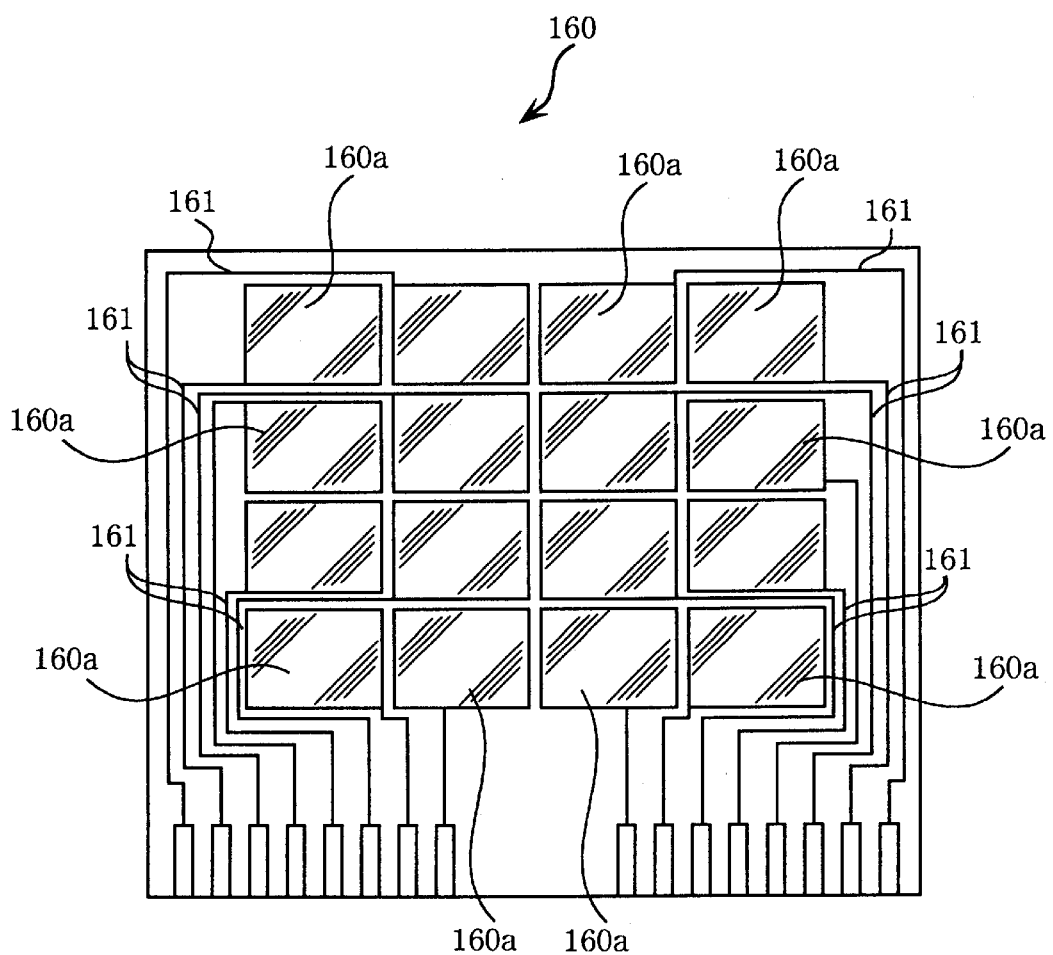
FIG. 4 is a structural drawing showing the construction of electrodes of the dispersed type liquid crystal panel used in the 2-D/3-D compatible type image display according to a third embodiment of the present invention.

FIG. 4 is a plane view of a separation type transparent electrode 160 formed on the dispersed type liquid crystal panel. The separation type transparent electrode 160 is constructed with 16 separated transparent electrodes 160a arranged 4 by 4 respectively in longitudinal and lateral directions. In a display area (within the region in which diffusing effect is on and off), transmission lines 161 connected to each of the separated transparent electrodes 160a are formed in horizontal direction of a display area. Consequently, even if the light separating means 110 (140) of, for example, the first and second embodiments are employed, the overlap of the transmitting portions 110a (140a) and the transmission lines 161, whereby remarkableness of the transmission lines 161 can be decreased when diffusing effect of the dispersed type liquid crystal panel is off. Although static driving method is employed for driving electrodes in FIG. 4, also matrix driving means can be employed as a method for driving electrodes in other constructions.

Figure 5A:
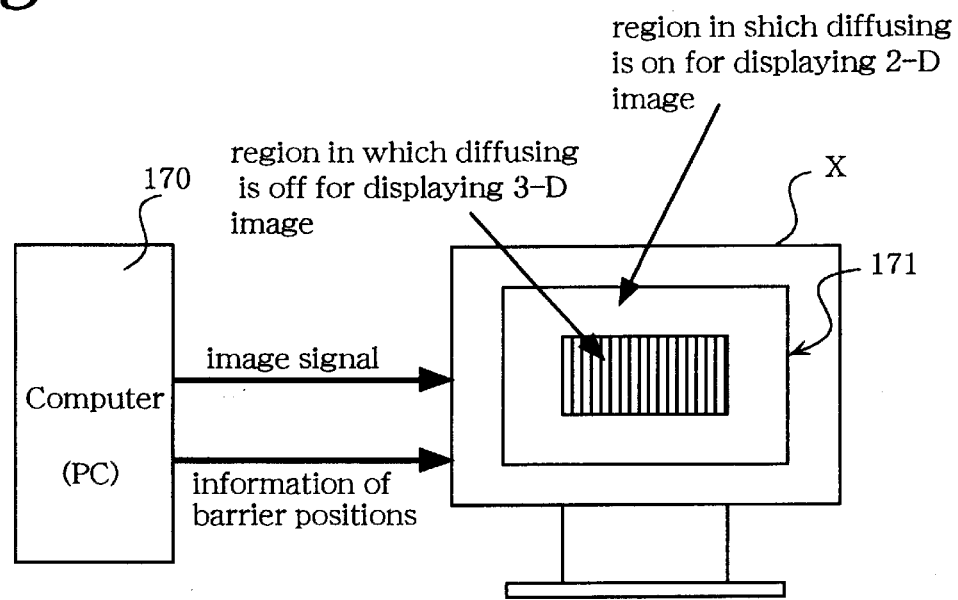
FIG. 5A is a schematic view showing an example construction for inputting image signal including both of 2-D and 3-D images to the 2-D/3-D compatible type image display comprising a dispersed type liquid crystal panel having a construction of electrode according to FIG. 4.
Figure 5B:
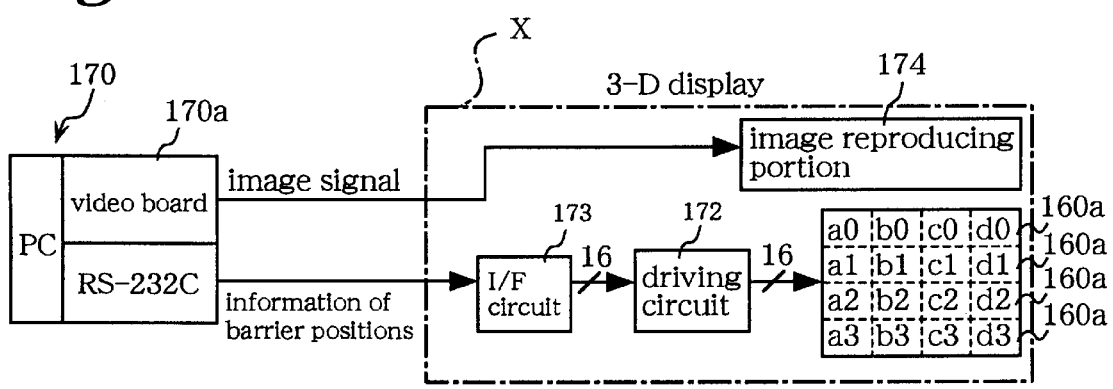
FIG. 5B is a functional block drawing simply showing internal construction of the 2-D/3-D compatible type image display according to FIG. 5A.

FIGS. 5A and 5B show an example construction in which image signal including both of 2-D and 3-D images as well as an information showing which one of the separated transparent electrodes 160a should be applied voltage (hereinafter referred to as an information of barrier position), as an information showing regions of diffusion, are input from a computer 170, and regions in a dispersed type liquid crystal panel 171 in which diffusing effect works is partially created on the basis of the information of barrier positions. In FIG. 5B, number of the separated transparent electrodes 160a is 16, each of which is indicated with reference numerals a0–a3, b0–b3, c0–c3, and d0–d3.

The image signal is input from a video board 170a of the computer 170 to an image reproducing portion 174 of an image display X. The image reproducing portion 174 drives a liquid crystal panel which is not illustrated in FIGS. 5A and 5B, on the basis of the image signal. Description is now made of a concrete example. The image signal is output by expanding image data stored in the computer 170 with the video board 170a. As shown in FIG. 6A, a format that one field is divided into two parts, right one and left one, the left eye images (L-ch) enter the left part, and the right eye images (R-ch) enter the right part is employed. The image reproducing portion 174 receives the image signal and processes it so that left eye images get into the left eye and the right eye images get into the right eye. If the image reproducing portion 174 is so constructed as to process images of a different format from above described one shown in FIG. 6B that one field is divided into two parts, upper one and lower one, image signal corresponding to the format may be created on the video board 170a by the computer 170. Furthermore, if the image reproducing portion 174 can deal with parallel input that the left eye images (L-ch) and the right eye images (R-ch) can be separately input, two sets of video boards 170a may be prepared for the computer 170 to create image signals at each ones.

The information of barrier positions is provided to the image display X according to this embodiment by RS232C which is a communication interface. A driving circuit 172 formed on the image display X obtains decoded information of barrier positions from an interface circuit 173 and control on/off of any separated transparent electrodes 160*a* on the basis of the information. To be concrete, the information of barrier positions is coded in the computer 170 and provided to the image display X by RS232C. The interface circuit 173 of the image display X decodes the code and gives on/off information of each separated transparent electrode 160*a* to the driving circuit 172. The driving circuit 172 controls on/off of the separated transparent electrodes 160*a* on the basis of the on/off information.

More concrete description is made now. As shown in FIG. 7, in a case of reproduced image A which is a 3-D image using whole display area, for example, an information of barrier positions "all off" is coded as to "0000000000000000", and the code is provided to the image display X by RS232C. The interface circuit 173 of the image display X decodes the code and gives decoded information to the driving circuit 172. Accordingly, the driving circuit 172 controls the separated transparent electrodes 160a so that diffusing effect is off on whole display area, whereby an observer can recognize 3-D images using whole display area. In a case of a reproduced image B only upper half of which is a 3-D image, an information of barrier positions "a0b0c0d0a1b1c1d1 are off" may be coded as to "0000000011111111". Accordingly diffusing effect is off only in upper half of the display area, whereby the observer can observe 3-D images in the upper half of the display area and 2-D images without degradation in lower half of the display area. Furthermore, in a case of a reproduced image C only left side half of which is a 3-D image, an information of barrier positions "a0b0a1b1a2b2a3b3 are off" may be coded as to "0011001100110011". Accordingly, diffusing effect is off only in the left side half of the display area, whereby the observer can observe 3-D images in the left side half of the display area and 2-D images without degradation in right side half of the display area.

In a case that a reproduced image signal changes from A to B and B to C as time passes, following measures can be thought of.

(1) When the reproduced image is obtained by reproducing a recording medium set in the computer 170, an information that the reproduced image changes from A to B and B to C and a timing information of the change are included in the information of barrier positions.

(2) When the reproduced image is obtained by communication between computers, information of barrier positions is obtained from transmission side at every change from A to B and B to C.

(3) When the reproduced image changes through process by the computer 170 itself, the information of barrier positions can be created by the computer 170.

(4) When the reproduced image changes on the basis of a predetermined time schedule from A to B and B to C, the computer 170 measures time and create the information of barrier positions on the basis of the time.

Figure 8:
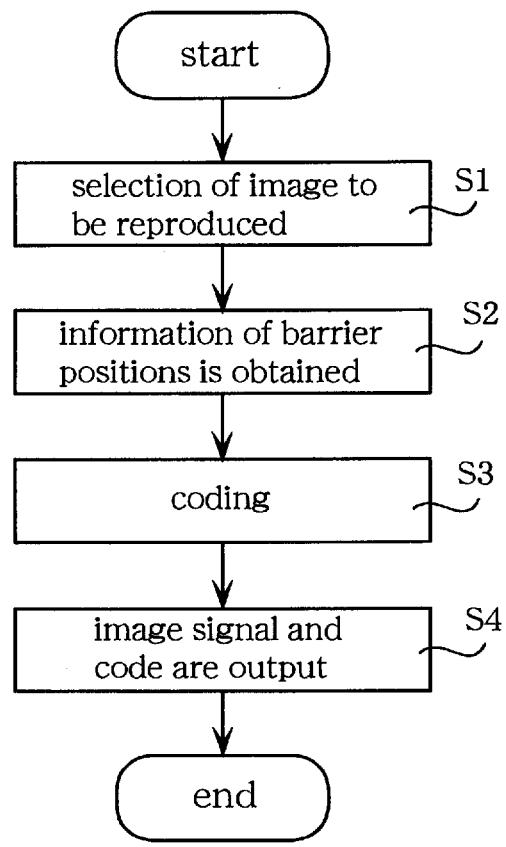
FIG. 8 is a flow chart showing example process of outputting the image signal including both of 2-D and 3-D images and the information of barrier position.

FIG. 8 is a flow chart showing a process of the computer 170 in a case that reproduced images N=1 to N=99 are displayed according to above method (4). As an initial setting, a process for N=1 and timer resetting are carried on (step 1). It is judged if N is 100 or not (step 2). If N is 100, process is finished. If N is not 100, image and the information of barrier positions of N are output (step 3). It is judged if time for display has been passed (step 4). If the time for display has been passed, N is incremented (step 5) and process goes back to step 2.

Above-described process (1) to (4) is example only and is not to be taken by way of limitation. It is enough if the reproduced image and the information of barrier positions of the image are synchronizingly output from the computer 170.

As above-described, according to the 2-D/3-D compatible type image display of this embodiment, both of 2-D and 3-D images can be obtained as high quality of images, when both of 2-D and 3-D images are included in one display area.

(Preferred Embodiment 4)

Description is now made of a fourth embodiment of the present invention in conjunction with the accompanied drawings.

Figure 9:
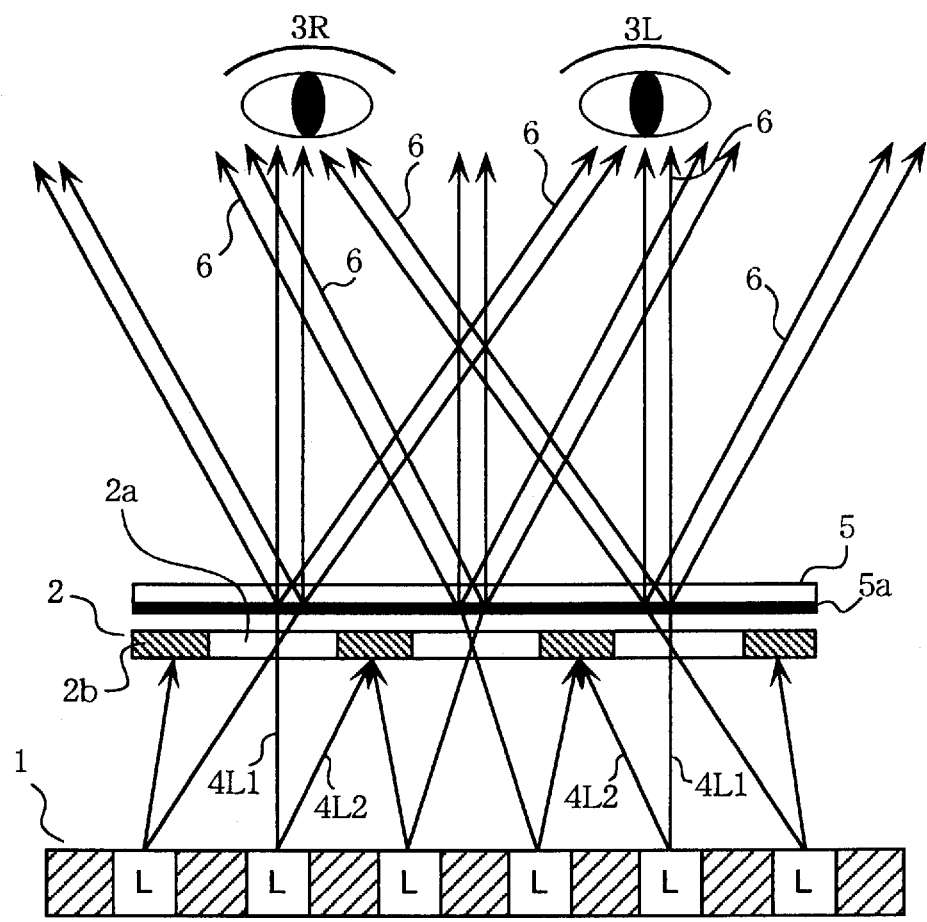
FIG. 9 is a plane view showing construction of the 2-D/3-D compatible type image display according to a fourth embodiment of the present invention, when 2-D images are displayed thereby.
Figure 17:
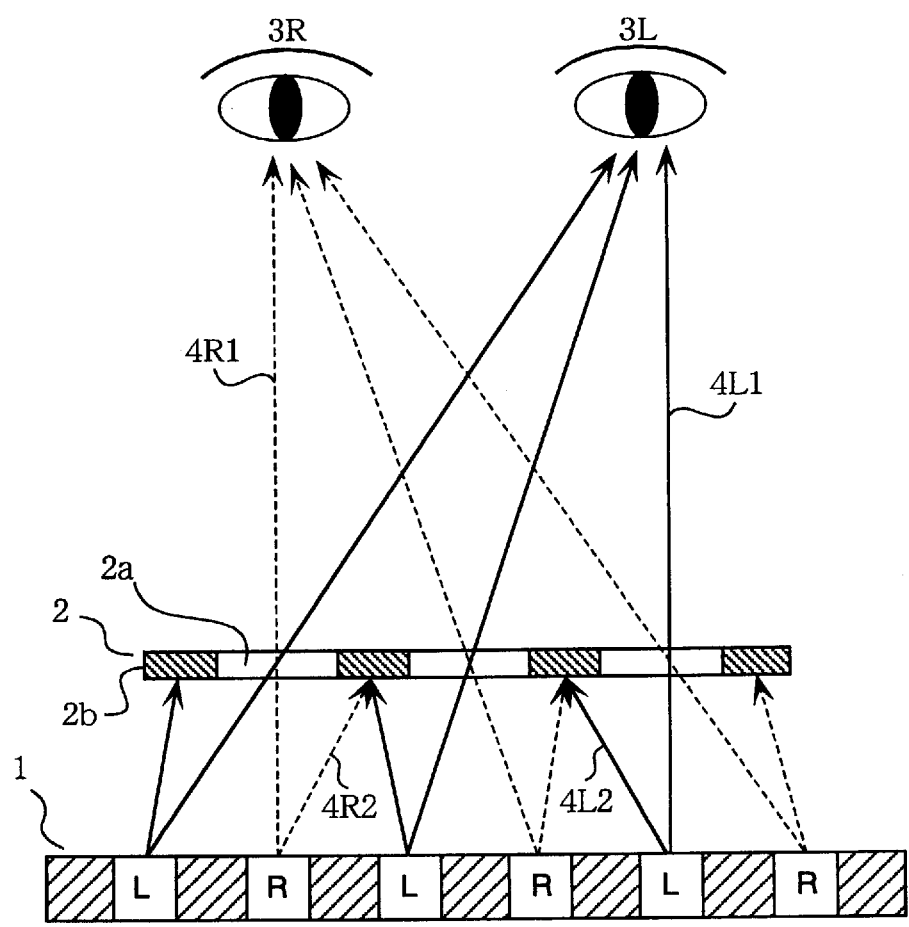
FIG. 17 is a plane view showing a construction of a conventional 3-D image display.
Figure 18:
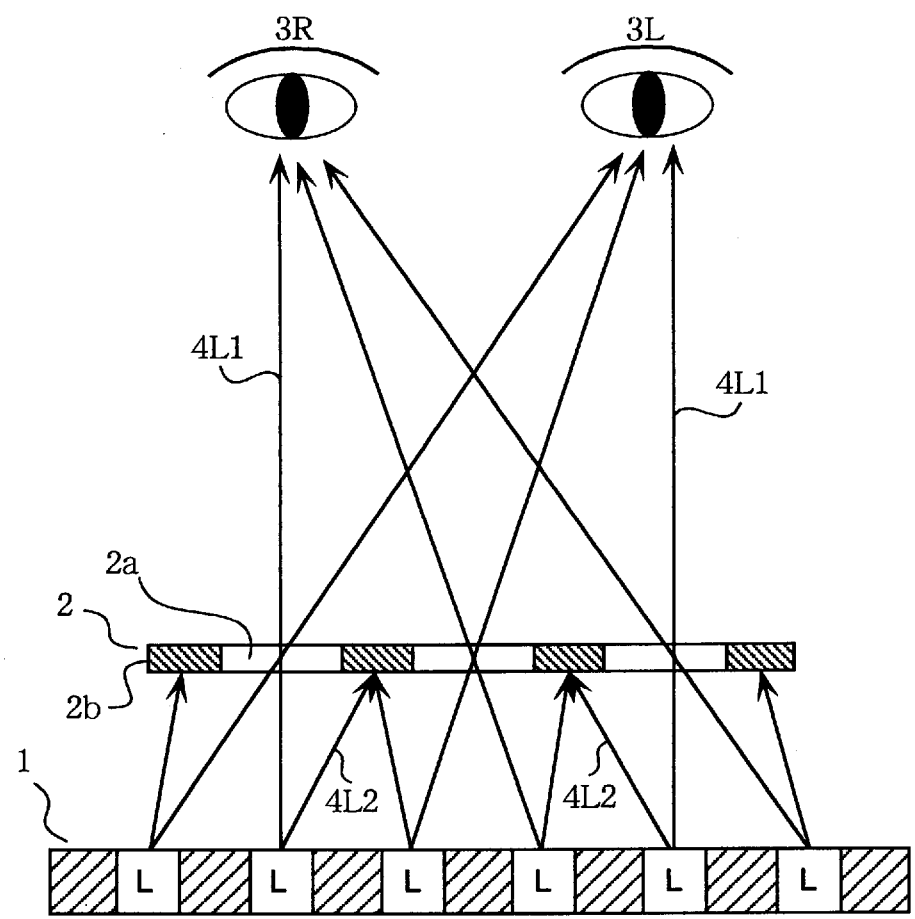
FIG. 18 is a plane view showing a construction of the conventional 3-D image display when 2-D images are displayed thereby.

FIG. 9 is a plane view simply showing the construction of image display according to this embodiment when 2-D images are displayed. Portions which are the same with those shown in FIG. 17 are indicated with the same reference numerals, and description on the portions is not repeated.

According to a image display of the fourth embodiment, when 2-D images are displayed, a diffusing sheet 5 is arranged on the light emission side (on a side of an observer) of the parallax barrier substrate 2. On the light incidence side (on a side of the barrier substrate 2) of the diffusing sheet 5, a diffusing portion 5*a* where light passes by in diffused condition is formed.

According to a image display of the fourth embodiment, when 2-D images are displayed, the first group of pixels and the second group of pixels constructing a display area of the liquid crystal panel 1 comprises pixels of the same observing points, for example, left eye pixels L.

Out of light which is emitted from the left eye pixels L, light 4L1 which passes by a transmitting portion 2*a* of the parallax barrier 2 is diffused in a diffusing portion 5*a* of the diffusing sheet 5 and emitted as diffusing light 6 extended in various directions.

Consequently, in front of a display area (on the light emission side of the diffusing sheet 5), diffusing light 6 from all of the left eye pixels L which are displayed on the display area is equally transmitted. The observer can view images displayed on the liquid crystal 1, that is, ordinary 2-D images, in a good condition without moire or the like in the proper observing position for 3-D images or any position out of the proper observing position.

When 3-D images are displayed on the image display according to this embodiment, the diffusing sheet 5 is replaced and the first group of pixels and the second group of pixels constructing display areas on the liquid crystal panel 1 comprises left eye pixels L and right eye pixels R which have different observing points to each other, as shown in FIG. 17.

In above construction, as above-described, an observer in a proper observing position can view 3-D images by recognizing left eye pixels L with the left eye 3L, and right eye pixels R with the right eye 3R.

The diffusing portion 5*a* may be formed on the light emission side of the diffusing sheet 5, not on the light incidence side. If consideration is given on that the shorter the distance between the diffusing portion 5*a* and the liquid crystal panel 1, the less blurredness of display areas is, it is better to form the diffusing portion 5*a* on the light incidence side of the diffusing sheet 5.

Figure 10A:
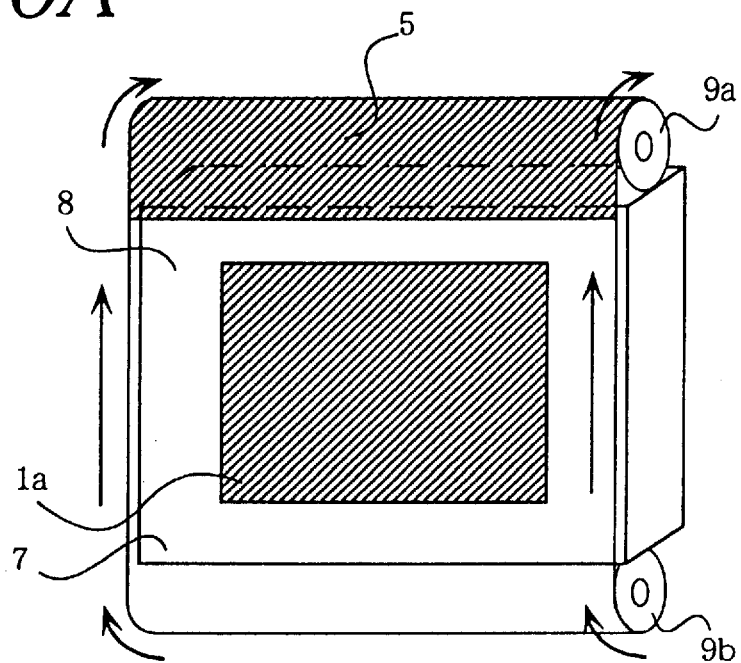
FIG. 10A is a perspective view showing a condition that the light diffusing means is removed from a display area by the moving means.
Figure 10B:
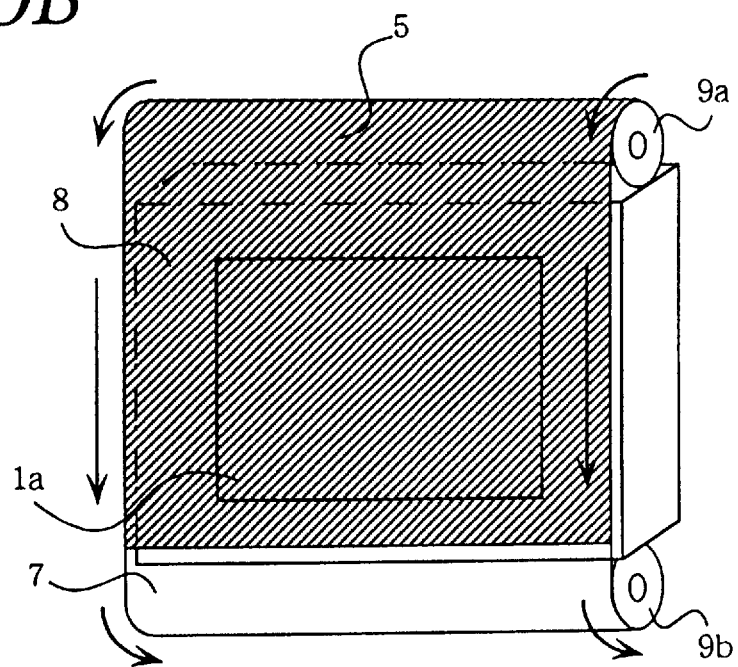
FIG. 10B is a perspective view showing a condition that the light diffusing means is placed on the display area by the moving means.
Figure 11:
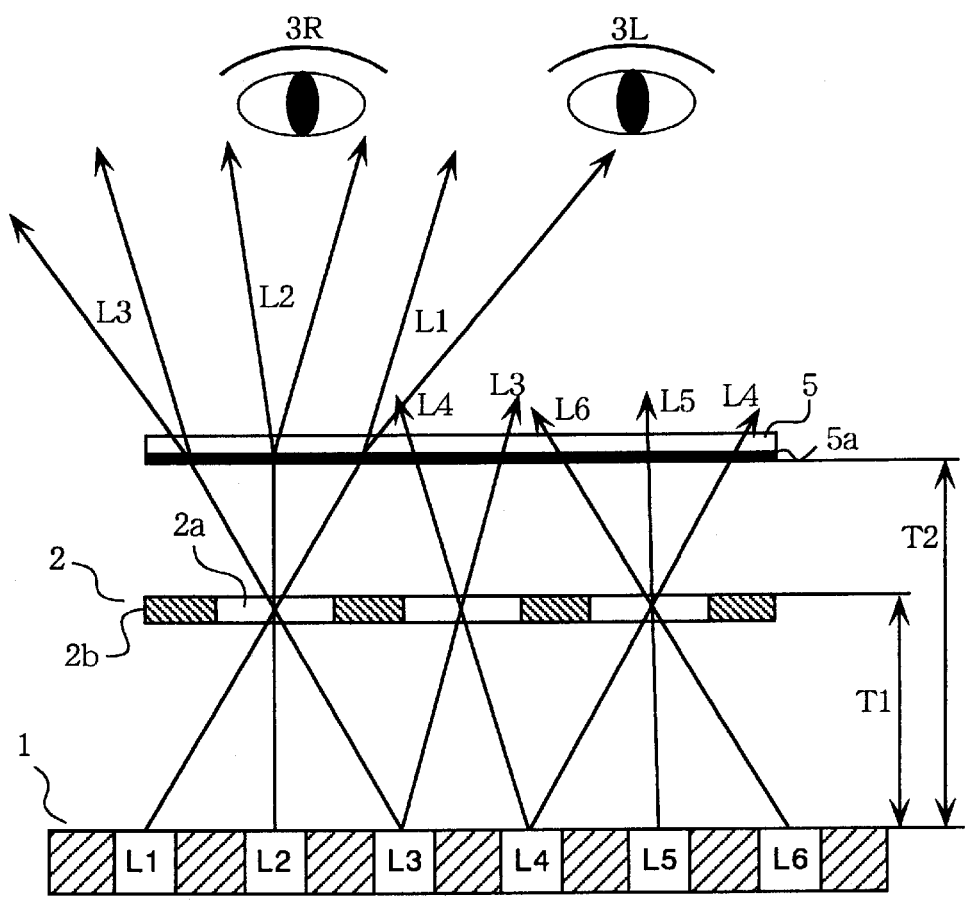
FIG. 11 is an explanatory diagram showing a condition of light from pixels being diffused in a condition that positions of the light is changed in the 2-D/3-D compatible type image display according to the fourth embodiment of the present invention.

The diffusion sheet 5 can be set on and replaced as follows: As shown in FIG. 10, a sheet 8 formed by connecting the diffusing sheet 5 with a clear sheet 7 is wound round rollers 9*a* and 9*b*. When 3-D images are displayed, the rollers 9*a* and 9*b* are turned so that the clear sheet 7 lies in front of a display area 1a of the liquid crystal panel, as shown in FIG. 10A. When 2-D images are displayed, the rollers 9a and 9b are turned so that the diffusing sheet 5 lies in front of a display area 1a of the liquid crystal panel, as shown in FIG. 10B.

The diffusing sheet 5 is a polycarbonate film or a polyethylene telephtalate film on which unevenness to be the diffusing portion 5a is formed by rolling or electric discharge process.

Instead of the diffusing film sheet, a diffusing sheet may be used. The diffusing sheet is formed by making plate of melted acril adding an emulsion, or applying glass powder, metal powder, or ceramic paints including resin or the like on a glass plate, or applying flatting agent and organic paint including white pigment on a glass plate.

The diffusing film sheet or the diffusing sheet may be formed with diffraction grating which diffuse light in the right and left directions.

Instead of the diffusing sheet, PDLC may be arranged on the light emission side of the parallax barrier substrate 2. When 3-D images are displayed, liquid crystal of the dispersed type liquid crystal is made clear (on) and directions of light become the same with those shown in FIG. 17, whereby an observer in a proper observing position can recognize 3-D images. When 2-D images are displayed, liquid crystal of the dispersed type liquid crystal panel is diffused (made off), whereby the observer can recognize good 2-D images without moire, in the proper observing position or any position out of the proper observing position.

According to the fourth embodiment, if the diffusing sheet 5 is separated from the parallax barrier 2, light from respective pixels which passed by the transmitting portions 2a of the parallax barrier 2 intersect one another and are diffused at the diffusing portions 5a in a condition that positional relationship of light to the right and light to the left is changed, and the observer gets incidence of the light. Consequently, the observer recognizes degraded 2-D images.

If a distance between a display area and the parallax barrier 2 is T1 and a distance between the display area and the diffusing portions 5a is T2, it is necessary for resolving above-described problem that a formula T1=T2 or T1>T2 is satisfied.

Figure 12:
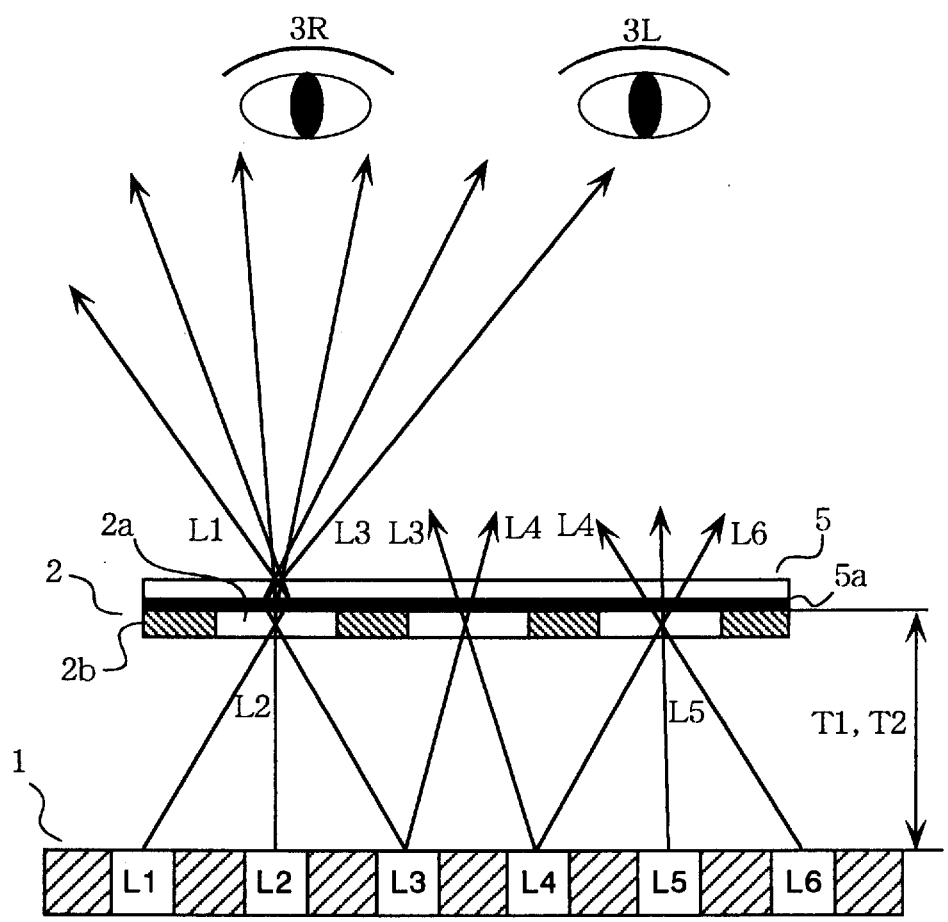
FIG. 12 is an explanatory diagram showing light from pixels being diffused in a condition before positions of the light is changed in the 2-D/3-D compatible type image display according to the fourth embodiment of the present invention.

In other words, according to the fourth embodiment, the diffusing portion 5a of the diffusing sheet 5 have to be closely arranged to the parallax barrier substrate 2 to satisfy the formula T1=T2. In such a condition, as shown in FIG. 12, light which passed by the transmitting portions 2a of the parallax barrier 2 are diffused in a proper condition that positional relationship of light to the right and light to the left has not changed at the diffusing portion 5a, and gets into the observer's eyes. As a result, the observer can recognize good 2-D images without degradation. Although positional relationship of light to the right and light to the left looks intersected in FIG. 12 because of drawing condition, the light intersects one another at the diffusing portion 5a and positional relationship is not changed, since the parallax barrier substrate 2 is thin.

The diffusing sheet may be arranged between the liquid crystal panel and the parallax barrier substrate. In this construction, which is not illustrated, the formula T1>T2 is satisfied, whereby above-described effects can be obtained.

Instead of the parallax barrier substrate 2 used as a light separating means in the fourth embodiment, lenticular lens may be used to separate light in the right and the left.
(Preferred Embodiment 5)

The present invention can be applied to a device constructed so that light is separated into light for left eye and light for right eye before the light gets into the display panel, as disclosed in Japanese Patent Laid Open Gazette No. 156791/1989.

Figure 13:
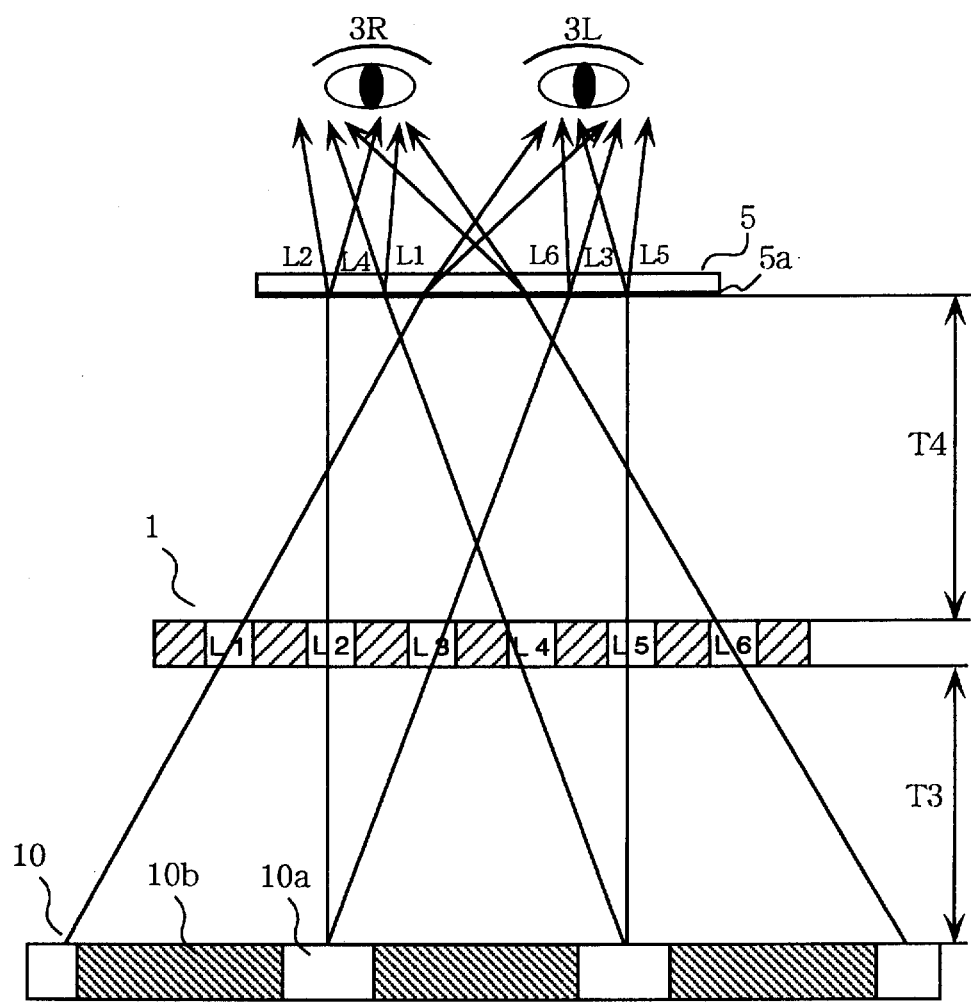
FIG. 13 is an explanatory diagram showing light from pixels being diffused in a condition that positions of the light are changed in the 2-D/3-D compatible type image display according to the fifth embodiment of the present invention.

However, the construction with the barrier substrate on the light incidence side has the same problem. If a distance between the liquid crystal panel 1 and the diffusing sheet 5 become large, light from respective pixels in the liquid crystal panel 1 are diffused at the diffusing portions 5a in a condition that positional relationship of light to the right and light to the left is changed and get into observer's eyes, as shown in FIG. 13. Consequently, as above-described, the observer recognize degraded 2-D images. The barrier substrate on the light incidence side which is indicated with a reference numeral 10 in FIG. 13 comprises transmitting portions 10a which is apertures where light passes by and barrier portions 10b which are located to block light alternately formed in horizontal direction.

If a distance between the barrier substrate on the light incidence side 10 and pixels is T3 and a distance between the pixels and the diffusing portion 5a is T4, it is necessary for resolving above problem to satisfy a formula T3=T4 or T3>T4.

In other words, arranging the diffusing sheet 5 closely to pixels, light from pixels in the liquid crystal panel 1 are diffused at the diffusing portion 5a in a proper condition that positional relationship of light to the right and light to the left has not changed, and gets into the observer's eyes. As a result, the observer can recognize good 2-D images without degradation.

Figure 14:
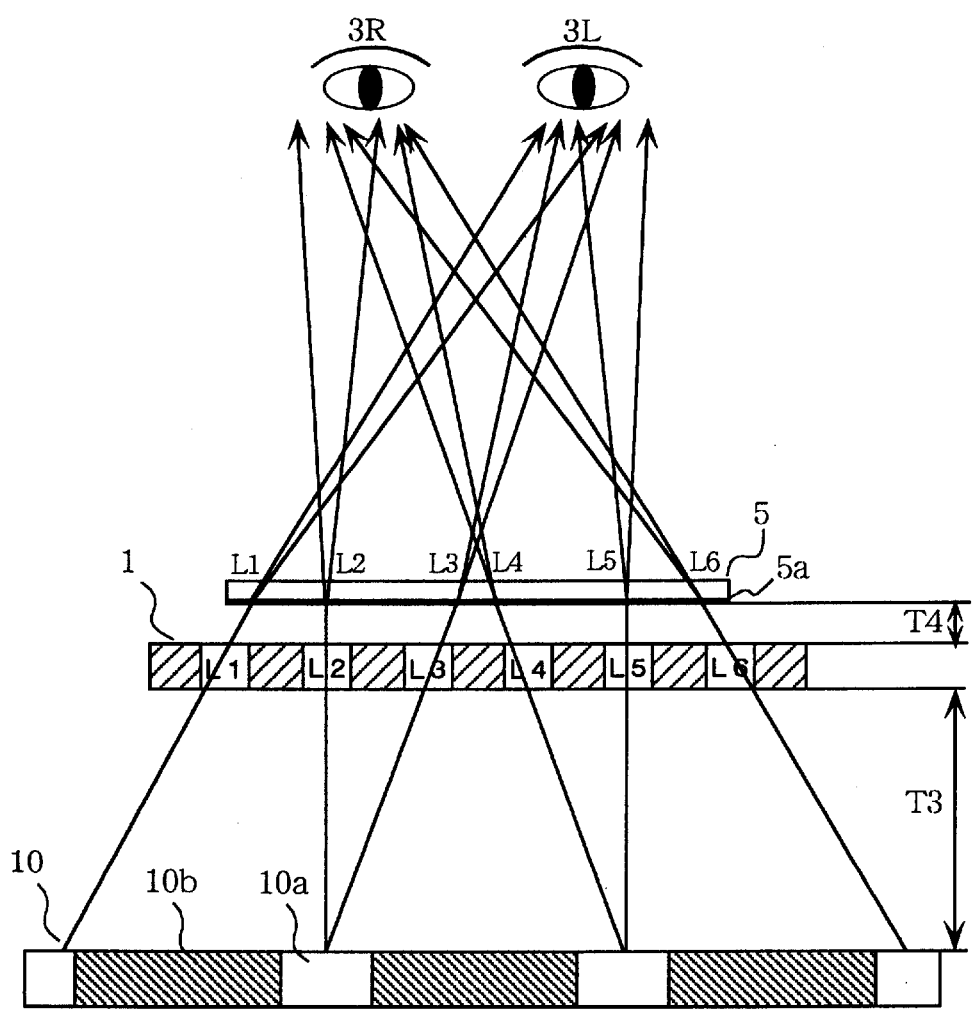
FIG. 14 is an explanatory diagram showing light from pixels being diffused in a condition before positions of the light is changed in the 2-D/3-D compatible type image display according to the fifth embodiment of the present invention.
Figure 15:
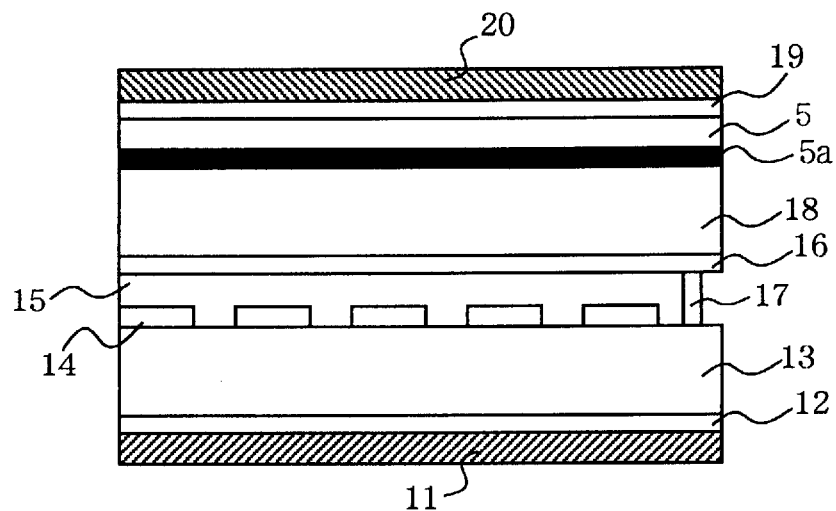
FIG. 15 is a plane view showing a concrete example of constructions of the liquid crystal plate and the diffusing sheet according to the fifth embodiment of the present invention.

FIG. 15 shows a concrete example of constructions of the liquid crystal plate 1 and the diffusing sheet 5 for realizing a device according to the fifth embodiment which is shown in FIG. 14.

In FIG. 15, reference numeral 11 indicates a polarizing plate on the light incidence side, 12 indicates a retardation film, 13 indicates a transparent substrate on the light incidence side, 14 indicates display electrode, 15 indicates liquid crystal layer, 16 indicates transparent electrode, 17 indicates a seal portion, 18 indicates a transparent substrate on the light emission side, 19 indicates another retardation film, and 20 indicates a polarizing plate on the light emission side. The liquid crystal panel 1 comprises above elements. The retardation film 19 and the polarizing plate on the light incidence side 20 are formed so as to be larger than a display area.

When 2-D images are displayed, the diffusing sheet 5 is arranged so that the diffusing portion 5a touches to a light emission side of the transparent substrate on the light emission side 18 of the liquid crystal panel 1. Since the retardation film 19 is stuck to the light emission side of the diffusing sheet 5 on one side and to the polarizing plate on the light emission side 20 on the other side, the retardation film 19, the polarizing plate 20, and the diffusing sheet 5 are unitedly moved by mechanisms shown in FIGS. 10A and 10B. Consequently, when 2-D images are displayed, the retardation film 19, the polarizing plate 20, and the diffusing sheet 5 are in condition of FIG. 15. When 3-D images are displayed, the diffusing sheet 5, the retardation film 19, and the polarizing plate 20 are removed from front side (light emission side) of the liquid crystal panel 1, and only a portion comprising the retardation film 19 and the polarizing plate on the light emission side 20 is arranged on a display area again.

According to above construction, when 2-D images are displayed, the diffusing portion 5a is positioned on the light emission side of the transparent substrate on the light emission side 18 without the retardation film or the polarizing plate therebetween, as shown in FIG. 15, whereby a distance between the display electrode 14 which works as a display pixel and the diffusing portion 5a is smaller than in a case that an ordinary liquid crystal panel comprising a retardation film and a polarizing plate on the light emission side is arranged on the light emission side of the transparent substrate on the light emission side. In other words, above construction satisfies the formula T3>T4, whereby light from respective pixels in the liquid crystal panel 1 are diffused at the diffusing portion 5a in a proper condition that positional relationship of light to the right and light to the left has not changed, as shown in FIG. 14, and the observer can recognize good 2-D images without degradation.

Figure 16:
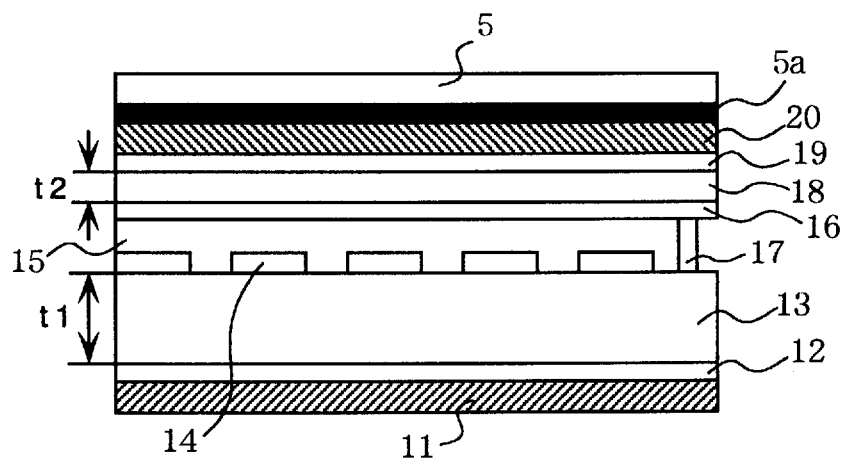
FIG. 16 is a plane view showing another concrete example of constrictions of the liquid crystal plate and the diffusing sheet according to the fifth embodiment of the present invention.

FIG. 16 shows a concrete example of constructions of the liquid crystal panel 1 and the diffusing sheet 5 for realizing a image display according to the fifth embodiment as shown in FIG. 14, which is different from the one shown in FIG. 15. Portions which are the same with those shown in FIG. 15 are indicated with the same reference numerals.

According to the construction of FIG. 16, thickness t2 of the transparent substrate on the light emission side 18 is smaller than thickness t1 of the transparent substrate on the light incidence side 13. The retardation film 19 is stuck to the light emission side of the transparent substrate on the light emission side 18, and the polarizing plate on the light emission side 20 is stuck thereon. The Liquid crystal panel 1 comprises above elements.

When 2-D images are displayed, the diffusing sheet 5 is arranged so that the diffusing portion 5a touches the light emission side of the polarizing plate on the light emission side 20, as shown in FIG. 16. When 3-D images are displayed, the diffusing sheet 5 is replaced from the front side of the liquid crystal panel 1.

In other words, if the diffusing sheet 5 is arranged on the front side of the liquid crystal panel 1 when 2-D images are displayed, the distance between the display electrode 14 and the diffusing portion 5a is smaller than in a case that an ordinary liquid crystal panel in which a transparent substrate on the light incidence side and a transparent substrate on the light emission side have the same thickness is used, for the thickness t2 of the transparent substrate on the light emission side 18 of the liquid crystal panel 1 is thin. Consequently, above construction satisfies the formula T3>T4, whereby light from respective pixels in the liquid crystal panel 1 is diffused at the diffusing portion 5a in a proper condition that positional relationship of light to the right and lights to the left has not changed, as shown in FIG. 14, and the observer can recognize good 2-D images without degradation.

Since a STN-type liquid crystal panel is used as the liquid crystal panel 1 in the constructions of FIGS. 15 and 16, the retardation films 12 and 19 are used therein. If a liquid crystal panel of active matrix driving method (TFT method) is used as the liquid TN-type crystal panel, the retardation films 12 and 19 are not necessary.

Although the present invention has been described and illustrated in detail, it is clearly understood that the same is by way of limitation, the spirit and scope of the present invention being limited only by the terms of the appended claims.

What is claimed is:

1. A 2-D/3-D compatible image display comprising:
   a display panel in which display areas are constructed with a first group of pixels and a second group of pixels;
   a plane light source formed on the light incidence side of said display panel, which emits light in a plane shape:
   a light separating means formed between said display panel and said plane light source, which separates light form said first group of pixels and said second group of pixels into the right and left:
   a diffusing effect on/off panel which is controlled not to diffuse but transmit the light from said light separating means by making said first group of pixels and said second group of pixels have different observing points to each other respectively as left eye pixels and right eye pixels when 3-D images are displayed, and to diffuse the light from said light separating means by making said first group of pixels and said second group of pixels have the same observing points with each other when 2-D images are displayed,
   said light separating means comprises vertical striped barrier portions and vertical striped light transmitting portions alternately formed in a horizontal direction to separate the light from said first group of pixels and said second group of pixels,
   wherein each barrier portion of said light separating means are formed by laminating a reflection film and a light absorbing film which are respectively arranged on the side of the light source and on the side of the display panel.

2. The 2-D/3-D compatible type image display according to claim 1, wherein
   said display panel and said diffusing effect on/off panel stick to each other.

3. The 2-D/3-D compatible type image display according to claim 1, wherein
   both of said light separating means and said diffusing effect on/off panel include the same transparent substrate as an element.

4. A 2-D/3-D compatible type image display comprising:
   a display panel in which display areas are constructed with a first group of pixels and a second group of pixels;
   a light separating means comprises vertical striped barrier portions and vertical striped light transmitting portions alternately formed in a horizontal direction, said light separating means for separating light from said first group of pixels and said second group of pixels. wherein each vertical striped barrier portion is formed by laminating a reflection film and a light absorbing film which are respectively arranged on a side of a light source and on a side of said display panel; and
   a diffusing effect on/off panel which is controlled so that the light from said light separating means is diffused in a region corresponding to a region of the display area for displaying 2-D images and pass a region corresponding to a region of the display area for displaying 3-D images when both of the 3-D images, obtained by making said first group of pixels and said second group of pixels have different observing points to each other respectively as left eye pixels and right eye pixels, and 2-D images, obtained by making said first group of pixels and said second group of pixels have the same observing points with each other, are included in one display area.

5. The 2-D/3-D compatible type image display according to claim 4 comprising
   a drive controlling means which input signal including both of 2-D and 3-D images, as well as information of region for diffusion, and partially create diffusing effect region in said diffusing effect on/off panel on the basis of the information of region for diffusion.

6. The 2-D/3-D compatible type image display according to claim 4, wherein said diffusing effect on/off panel is a dispersed type liquid crystal panel, a plurality of electrodes are formed on at least one inside surface of the dispersed type liquid crystal panel, and any one, or plurality, or all of said plurality of electrodes can be applied voltage.

7. The 2-D/3-D compatible type image display according to claim 6, wherein transmission lines connected to said plurality of electrodes are formed in horizontal direction of a picture within the diffusing effect region.

8. The 2-D/3-D compatible type image display according to claim 4, wherein said display panel and said diffusing effect on/off panel stick to each other.

9. The 2-D/3-D compatible type image display according to claim 4, wherein both of said light separating means and said diffusing effect on/off panel include the same transparent substrate as an element.

10. A 2-D/3-D compatible type image display comprising:

a display panel in which display areas are constructed with a first group of pixels and a second group of pixels;

a light separating means which separates light from said first group of pixels and said second group of pixels into the right and the left; and a light diffusing means which is arranged for diffusing light from said light separating means when 2-D images are displayed by making said first group of pixels and said second group of pixels have the same observing points, and removed for not diffusing but for passing the when 3-D images are displayed by making said first group of pixels and said second group of pixels have the different observing points to each other respectively as left eye pixels and right eye pixels, and wherein the light from each of the pixels, obtained through said pixels and said light separating means, enters into said light diffusing means before the positional relationship in right and left direction is reversed.

11. The 2-D/3-D compatible type image display according to claim 10, wherein said light separating means is arranged on the light emission side of said display panel, and said light diffusing means is in proximity to a surface on the light emission side of said light separation means when the light diffusing means is arranged.

12. A 2-D/3-D compatible type image display comprising:

a display panel in which display areas are constructed with a first group of pixels and a second group of pixels, a light separating means which separates light from said first group of pixels and said second group of pixels into the right and the left, and a light diffusing means which is arranged for diffusing light from said light separating means when 2-D images are displayed by making said first group of pixels and said second group of pixels have the same observing points, and removed for not diffusing but for passing the light h when 3-D images are displayed by making said first group of pixels and said second group of pixels have the different observing points to each other respectively as left eye pixels and right eye pixels, wherein said light separating means is arranged on the light incidence side of said display panel, said display panel is constructed with a liquid crystal panel, and a light emission side polarizing plate is formed on the light emission side of said light diffusing means so arranged as to be removable.

13. The 2-D/3-D compatible type image display according to claim 12, wherein said light separating means is arranged to be in very close proximity to the transparent substrate on the light emission side of said liquid crystal panel.

14. A 2-D/3-D compatible type image display comprising:

a display panel in which display areas are constructed with a first group of pixels and a second group of pixels:

a light separating means which separates light from said first group of pixels and said second group of pixels into the right and the left; and a light diffusing means which is arranged for diffusing light from said light separating means when 2-D images are displayed by making said first group of pixels and said second group of pixels have the same observing points, and removed for not diffusing but for passing the light when 3-D images are displayed by making said first group of pixels and said second group of pixels have the different observing points to each other respectively as left eye pixels and right eye pixels, wherein said light separating means is arranged on the light incidence side of said display panel, said display panel is provided with a transparent substrate on the light emission side and a transparent substrate on the light incidence side, and the transparent substrate on the light emission side is thinner than the transparent substrate on the light incidence side of said display panel.

15. The 2-D/3-D compatible type image display according to claim 10, wherein said light diffusing means is constructed with a diffusing sheet or a diffusing film sheet, and a moving means for arranging said light diffusing means to diffuse the light from said light separating means when 2-D images are to be displayed, and for removing said light diffusing means in 3-D images are to be displayed is provided.

16. The 2-D/3-D compatible type image display according to claim 10, wherein said light diffusing means is constructed with a diffusing sheet or a diffusing panel having a diffusing portion on one side, and said diffusing sheet or the diffusing sheet is arranged so that said diffusing portion faces to the display panel.

17. The 2-D/3-D compatible type image display according to claim 10, wherein said light diffusing means is constructed with a diffraction grating.

18. A 2-D/3-D compatible image display comprising:

a display panel in which display areas are constructed with a first group of pixels and a second group of pixels;

a plane light source formed on the light incidence side of said display panel, which emits light in a plane shape;

a light separating means formed between said display panel and said plane light source, which separates light from said first group of pixels and said second group of pixels into the right and left;

a diffusing effect on/off panel which is controlled so that the light from said light separating means is diffused in a region corresponding to a region of the display area for displaying 2-D images and pass a region corresponding to a region of the display area for displaying 3-D images when both of the 3-D images, obtained by making said first group of pixels and said second group of pixels have different observing points to each other respectively as left eye pixels and right eye pixels, and 2-D images, obtained by making said first group of pixels and said second group of pixels have the same observing points with each other, are included in one display area, said light separating means comprises vertical striped barrier portions and vertical striped light transmitting portions alternately formed in a horizontal direction to separate the light from said first group of pixels and said second group of pixels, wherein each barrier portion of said light separating means are formed by laminating a refection film and a light absorbing film which are respectively arranged on the side of the light source and on the side of the display panel.

* * * * *